United States Patent Office 3,021,856
Patented Feb. 20, 1962

3,021,856
BREATHER VALVES FOR PIT PROPS
Herbert Bend, Chesterfield, and John James Wilson, Watendlath, Mitton, Tewkesbury, England, assignors to Dowty Mining Equipment Limited, Ashchurch, Tewkesbury, England
Filed Dec. 29, 1958, Ser. No. 783,305
Claims priority, application Great Britain Jan. 2, 1958
5 Claims. (Cl. 137—43)

The present invention relates to air breather valves especially suitable for hydraulic pit props.

In hydraulic props for supporting mine roofs it is usually the practice to provide a valved air breather passage to prevent the air pressure in the prop from varying appreciably from atmospheric pressure when the prop is being extended and contracted, especially since rapid contraction of the prop is desirable when the prop is being removed from its roof supporting position. In the most usual construction of prop, a hollow ram, operating within an external cylinder, also forms a storage reservoir for the hydraulic fluid, and the breather valve is situated at or near the top of the ram, in communication with the liquid reservoir. A problem encountered in the retrieving of props from the debris after they have fallen from the vertical position is that of preventing loss of hydraulic fluid by leakage past the air breather valve. In an attempt to prevent this loss proposals have been made to link the manually operated release valve with the breather valve so that the breather valve is open only at the same time as the release valve.

It is an object of the present invention to provide a non-leaking breather valve for use in such a structure and in such circumstances, without the necessity of providing any connection with the operation of the release valve.

According to the present invention a gravity operated valve especially suitable for this purpose comprises a cup providing a housing for a weight in the shape of a ball, and a spring loaded valve controlled thereby, the weight, or a component of the weight, of the ball opposing the valve spring to keep the valve open when the cup is vertical or is within a predetermined angle of inclination to the vertical, but the cup being so shaped that at greater angles of inclination the ball will not hold the valve open.

More particularly, according to the present invention, a hydraulic prop includes a spring-closed air breather valve controlling the air space within the liquid reservoir, above the liquid therein, the valve being controlled for opening solely by gravity and having no connection with the release valve. The breather valve is adapted to be kept open by the weight, or a component of the weight, of a ball when the prop is vertical or within a predetermined angle of the vertical, and to close when the ball rolls aside, as it will when the prop is in any other position, so as to prevent leakage of liquid from the reservoir.

When the prop is upright, extension and contraction of the prop is facilitated because the air space above the liquid in the reservoir is normally at ambient pressure. Upon the prop departing from the vertical position, an inclination is reached at which the valve closes under the force of the restoring spring to prevent loss of liquid from the reservoir, and moves aside the valve-opening ball or weight. Given the highest level of oil in the reservoir, the angle of inclination at which the valve is required to be closed can be accurately determined by the relation between the weight of the ball and the restoring spring and physical dimensions and shape of the ball and the cup into and from which the ball roll.

According to a further feature of this invention, the walls of the cup are of such shape and inclination that, when the prop is in the position in which the valve is open, any shocks normally encountered will not cause the ball to reopen the valve.

Examples of breather valves according to the invention will now be described with reference to the accompanying drawings in which.

Figure 1:
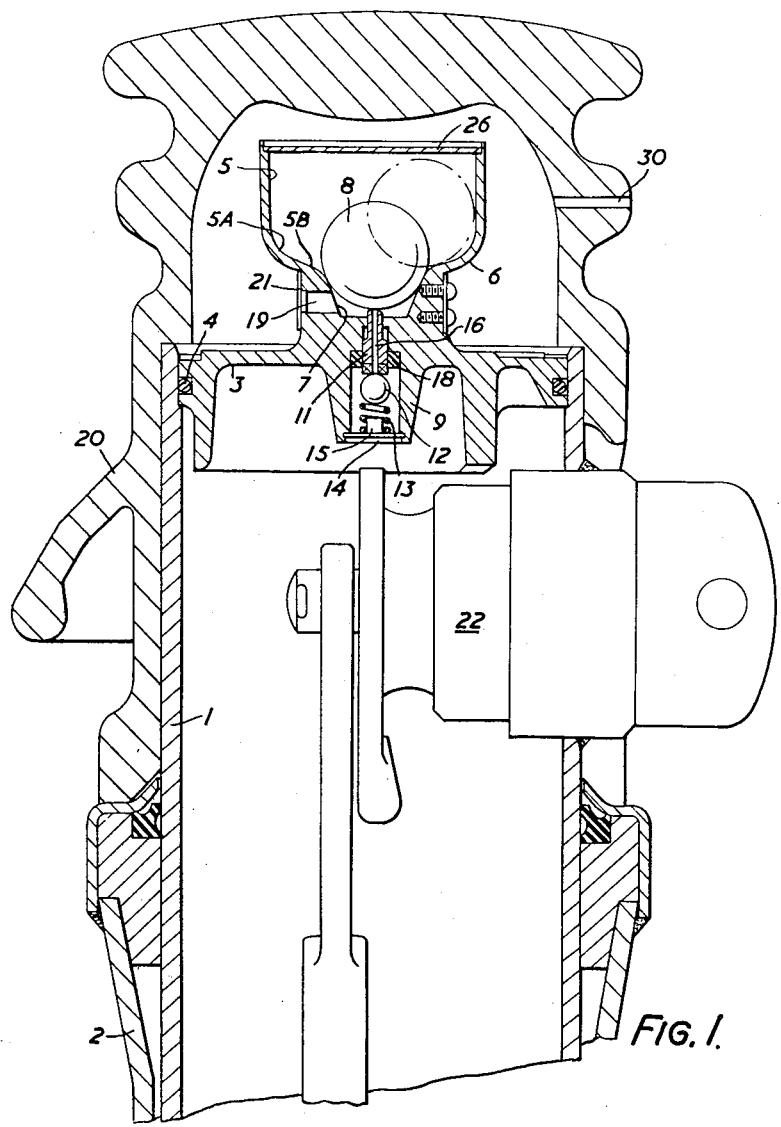
FIGURE 1 is a partial axial section through a portion of a hydraulic prop showing a breather valve in its normal open position.

Referring to the drawing the prop comprises a ram tube 1 telescoped within a cylinder 2. The ram tube 1 constitutes the liquid reservoir and is closed at its lower end in known manner by a liquid tight piston containing the pump, the manually operated release valve and an automatically operated relief valve. The arrangement of these latter parts forms no part of the present invention and they are not shown in the drawings.

The ram tube is closed at the top by a cover plate 3 which is a push fit into the tube and which is sealed in a liquid tight manner by means of a gasket, for example an O-ring 4.

At the top of the cover plate is a cup 6, which, in the construction now described, is formed integrally with the cover plate, but which may, instead, be formed as a separate removable member. The wall 5 of the cup presents a concavity or annular recess at 5A running into a convexity at 5B leading to a central conical recess 7 wherein a ball 8 will seat. The base of the cup is also formed with a hollow co-axial downward extension 9 and this is centrally bored to locate a plunger member 11 freely slidable therein. A ball valve 12 is supported between the lower end of the plunger and a helical restoring spring 13, which is seated on a disc 14 fitted in the end of the downward extension, the spring being centered by a stud 15.

A narrow channel 16 extends co-axially through the plunger which is slotted at its ends 17 and 17A where it makes contact with the ball valve 12 and ball 8 respectively. Surrounding the plunger and fixed at the end of the hollow extension 9 is an annular valve seating 18 for the ball valve 12.

In the position shown in the drawing, with the axis of the prop vertical the weight of the ball, rolling along walls 5A of the annular recess, and 7 of the central recess, depresses the plunger against the valve spring so that there is a free passage for the circulation of air from the air space at the top of the reservoir through the slotted end 17 of the plunger and the co-axial channel 16, the slotted end 17A of the plunger and through one or more radial channels 19 into the space contained within the prop cap 20, this space being always at ambient pressure since the prop cap has an air vent 30.

When the prop is moved from the vertical and reaches a critical angle determined by the gradient of the conical surface 7, which diverges at only a slight angle from the axis where it blends into the convexity 5B, and so into the annular recess at 5A, the walls whereof diverge at a greater angle, the large ball 8 rolls away from the top of the plunger 11 and allows the restoring spring 13 to reseat the ball valve 12 at 18, thus closing the channel 16, and providing a liquid tight seal to prevent loss of liquid from the reservoir. The ball eventually reaches the position shown in chain lines in FIGURE 1 (also FIGURE 2). The critical angle at which the valve closes will be suited to the particular kind of prop and the level of the hydraulic fluid therein.

Preferably the cone or central recess 7 formed at the base of the cup 6, within which the ball normally rests, is tangential to the ball 8 and the upper edge of said cone is at or near the circle of contact with the ball so that the ball is easily displaced when the prop reaches the critical position.

When an acceleration is imparted to the prop, for example by pulling upon a release cable, for removing the prop from the vertical position, this may have the effect of unseating the large ball 8 earlier, and so of closing the breather valve slightly earlier, in the descent of the prop to the horizontal.

A known device for effecting pumping and operation of the release valve is indicated by the collective reference 22. Since the operation of the breather valve 11, 12 is at all times quite independent of the mechanism 22 there can be no risk of oil leakage due to accidental operation of the mechanism 22 when the prop has fallen to the ground. The top of the cup 6 is closed by a removable plate 26.

When the prop is lying horizontally, for example when being transported by rail, it is desirable that any shocks normally encountered should not result in re-opening of the breather valve. To provide for this the internal walls of the cup 6 are so shaped that when the prop is horizontal the large ball 8 is trapped in the position shown in chain lines in FIGURES 1 and 2 in a recess formed by the cover plate 26 and the side walls of the cup, including the wall 5A, the inclination of the said walls 5A being such that any shocks which are normally encountered in transporting or handling the prop will not be sufficient to make the ball climb or jump into the position in which it re-engages the plunger 11 of the valve.

The air vent 19 is placed in such a position that it will be screened as far as possible from falling dirt and dust, which tends to collect on the top of the cover plate 3 and the plate 26 whilst also allowing any water which may have collected in the cup, while the prop is lying horizontal, to drain out of the cup rather than to pass down the central channel 16 of the plunger 11.

For additional protection the vent 19 is also covered by a filter 21 in the form of a collar.

Figure 2:
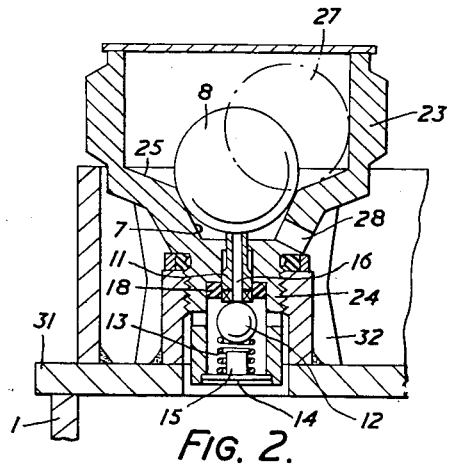
FIGURE 2 is an axial section of an alternative construction of breather valve.
Figure 3:
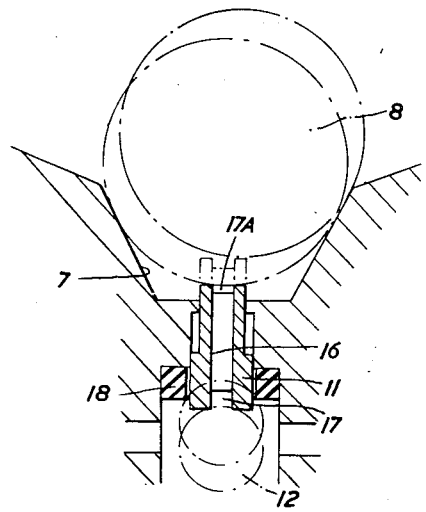
FIGURE 3 is a part axial section of FIGURE 2 in another plane and on a larger scale.

In an alternative construction shown in FIGURES 2 and 3 the cup 23 is made separately from the cover plate, the downward extension 24 of the cup being formed as a plug which can be screwed into a boss 29 secured to a cover plate 31. The principle of operation of the valve is similar to that shown in FIGURE 1. The spring loaded ball valve 12, the plunger 11, and the other components which, in this construction, are equivalent to the components already described with reference to FIGURE 1 and perform the same functions are similarly referenced. The walls 25 of the annular recess of the cup in FIGURES 2 and 3 are of different configuration from those shown at 5A in FIGURE 1 in that the gradients are rectilinear instead of being smooth curves, but the operation of the valve remains the same in principle. An air vent 28 is provided in the side of the cup 23 and this is protected by a gauze filter 32.

It will be seen that when the prop is horizontal the wall 25 of the annular recess presents a steeper gradient to the central axis than the conical recess 7. Although the ball 8 can roll back into the recess 7 when the prop is being raised to the vertical position, any shocks encountered in the horizontal position will not have the effect of re-seating the ball 8. Similar considerations apply in the case of the construction of FIGURE 1.

Modifications may be made in the construction whilst retaining the principle of operation. For example, the valve plunger 11 may be a rod of cruciform section, or otherwise externally fluted, instead of having the central channel 16 and the slots 17 and 17A, or any other construction of the plunger 11 may be adopted which will normally allow the passage of air but which will allow a liquid tight seal to be formed between the valve 12 and its seating 18 when the ball 8 is removed.

We claim as our invention:

1. A breather valve assembly at the top of a liquid reservoir which is more or less upright in use, but which at times may be horizontally disposed, a passage in a wall of said reservoir affording communication between the interior of such reservoir and the ambient atmosphere, a valve seating, a valve member arranged to seat thereon and so closing said passage, a spring urging said valve member to closed seated position, and a valve-operating member operatively connected to the valve, a cup formed with a central recess and a surrounding annular recess, the walls of the central recess being slightly divergent upwardly from the vertical when the reservoir is upright, and the walls of the annular recess being more greatly divergent from the vertical when the reservoir is upright, the walls of the two recesses merging about a circular zone, a ball weight received in said cup and of a size to enter and remain within the central recess in all upright positions of the reservoir, but to roll therefrom into the annular recess when the reservoir is horizontally disposed, said cup and said valve-operating member being relatively located to effect engagement of the ball with the valve-operating member when the ball is in the central recess, and consequent opening movement of the valve and its valve-operating member, and hence opening of said passage to the atmosphere, and the walls of the annular recess, outside the circular merging zone, being of a height in relation to the size of the ball to constitute a step barring reentry of the ball into the central recess under impetus, so long as the reservoir is horizontally disposed.

2. A breather valve assembly as in claim 1, wherein the valve member is disposed below and is spring-urged upwardly towards the valve seating to close when the reservoir is upright, and wherein the cup is located above the valve seating, and said passage including a portion extending through the valve seating and upwardly to the cup, and thence laterally, by-passing the ball when the latter is in the central recess, the valve-operating member extending upwardly through said passage into position for engagement and depression by the ball when the latter is in the central recess, but being shielded therefrom by the more widely divergent walls of the annular recess when the reservoir is horizontally disposed.

3. A breather valve assembly as in claim 1, said passage including a portion extending downwardly from the central recess for communication, through the valve seating, with the reservoir space below, and laterally, by-passing the ball, when the valve assembly and the reservoir are upright, and the ball is in the central recess, and wherein the valve-operating member comprises a plunger guided for movement in said air passage, and itself having a through passage for air, and open so long as the valve member is unseated.

4. A breather valve assembly according to claim 1, wherein the surfaces of the central recess and the annular recess merge by a curved surface tangent to the inclination of each thereof, the ball being of a size to seat within the central recess, near such curved surface.

5. A breather valve assembly according to claim 1, wherein the central recess and the annular recess of the cup are both of frusto-conical form, while the circle of contact of the ball weight with the central recess lies within the circle of intersection of the two frusto-conical surfaces of the cup.

(References on following page)

References Cited in the file of this patent

UNITED STATES PATENTS

| | | |
|---|---|---|
| 899,462 | Nelson | Sept. 22, 1908 |
| 2,113,454 | Mitchell | Apr. 5, 1938 |
| 2,258,019 | Kramer | Oct. 7, 1941 |
| 2,658,714 | Fooshee | Nov. 10, 1953 |

FOREIGN PATENTS

| | | |
|---|---|---|
| 544,427 | France | June 22, 1922 |
| 470,171 | Great Britain | Aug. 10, 1937 |